June 10, 1930.   W. S. FLEMING   1,762,619
CROSS OVER CONNECTION FOR BACK-TO-BACK PLUMBING FIXTURES
Filed Dec. 6, 1928   3 Sheets-Sheet 1
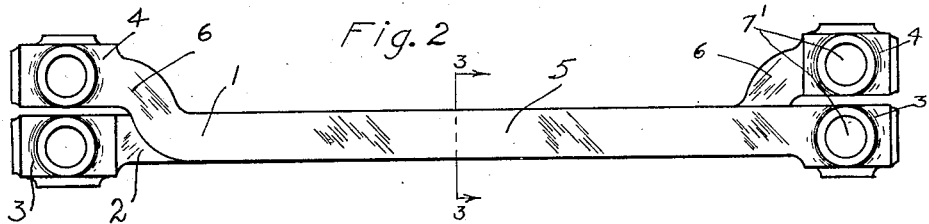
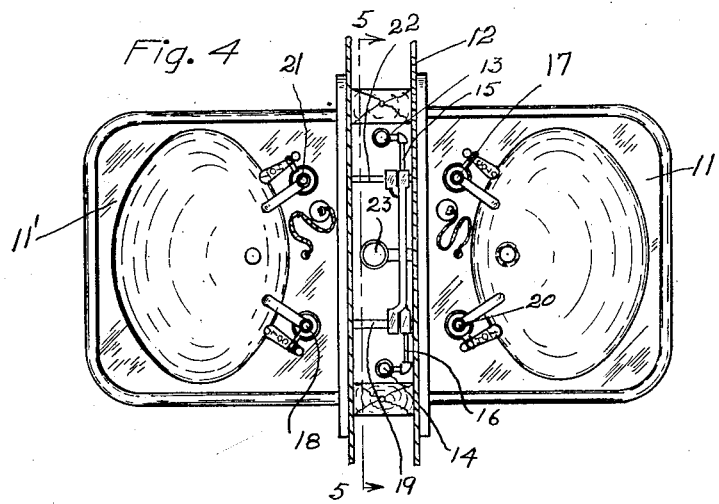
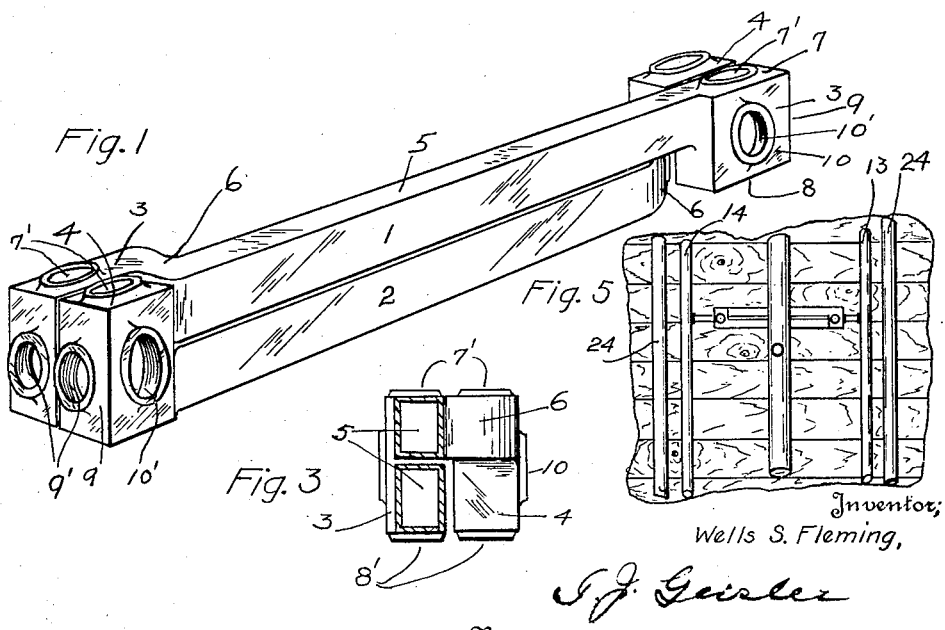
Inventor;
Wells S. Fleming, June 10, 1930.  W. S. FLEMING  1,762,619
CROSS OVER CONNECTION FOR BACK-TO-BACK PLUMBING FIXTURES
Filed Dec. 6, 1928  3 Sheets-Sheet 2
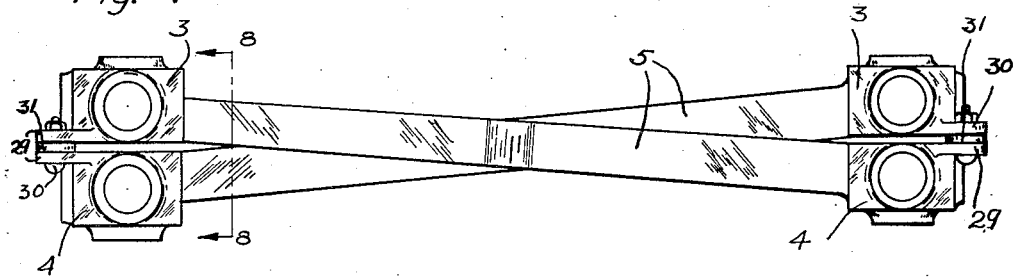
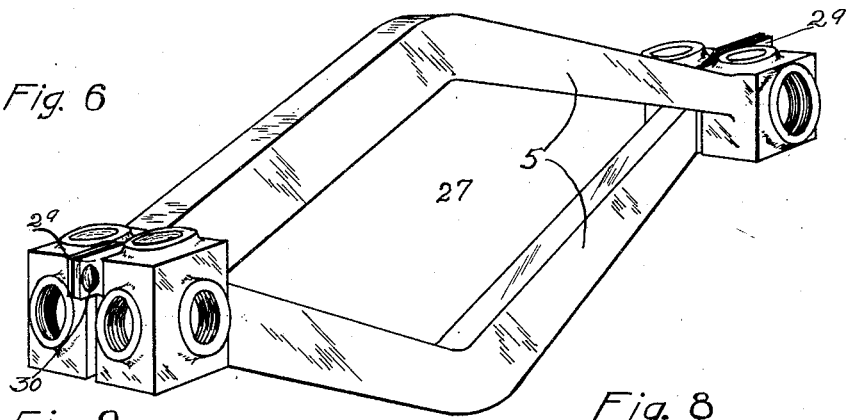
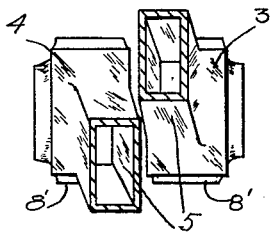
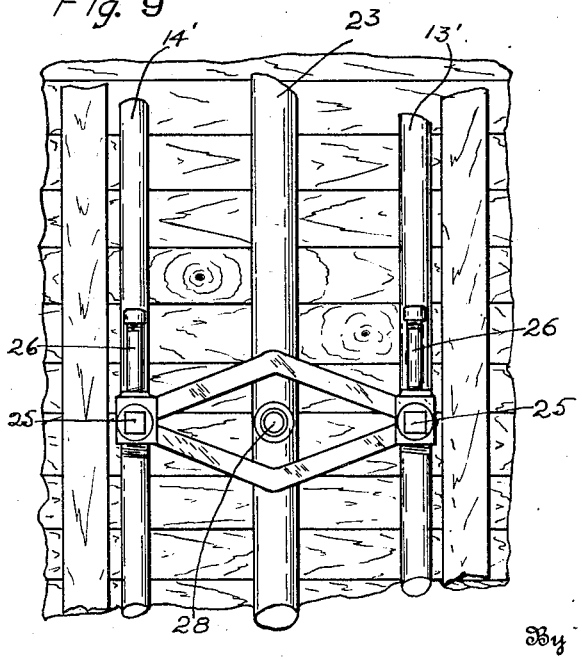
Inventor
Wells S. Fleming
By *T. J. Geisler*
Attorney June 10, 1930. W. S. FLEMING 1,762,619
CROSS OVER CONNECTION FOR BACK-TO-BACK PLUMBING FIXTURES
Filed Dec. 6, 1928 3 Sheets-Sheet 3

Inventor,
Wells S. Fleming,
By T. J. Geisler
Attorney.

Patented June 10, 1930

1,762,619

UNITED STATES PATENT OFFICE

WELLS S. FLEMING, OF PORTLAND, OREGON

CROSS-OVER CONNECTION FOR BACK-TO-BACK PLUMBING FIXTURES

Application filed December 6, 1928. Serial No. 324,273.

This invention relates to cross-over connections for installing back-to-back plumbing fixtures.

In many types of modern buildings the cost of plumbing installation is economized by installing lavatory bowls and the like in the adjoining rooms in back-to-back relation, whereby the cold and hot water supply pipes extending vertically in the partition walls are connected at each floor to the various lavatory fixtures. The best practice requires that the hot and cold water faucets of each of said fixtures shall be upon the same relative side. That is, that the hot water faucet shall always be on the left side of the fixture and the cold water faucet on the right side.

This detail of construction requires that the connections be crossed over between the supply pipe and the faucets. Such crossing over of the connecting pipes entails considerable labor and material costs, due to the use of numerous fittings, and the time required for installation.

Therefore, the object of my invention is to provide simple means, easily installed for connecting the hot and cold water faucets of such back-to-back fixtures, to common hot and cold water service pipes, so that the said faucets may be arranged always on the same relative side of the fixture, without the use of an excessive number of pipe fittings requiring considerable time to install.

Another object of my invention is to provide such means, adapted to occupy little space and to be installed under a variety of conditions of building construction and requirements.

I attain my objects in combination with a plumbing fixture comprising water-receiving receptacles arranged back-to-back, and hot and cold water faucets located to discharge into said receptacles, respectively, a cross-over connection between said faucets and the hot and cold water service pipe thereof, said connection consisting of tubular sections, the opposite ends of each section being provided with heads adapted to be arranged with the head at one end of one section located on the far side of the head at the same end of the other section, said heads provided with outlets, whereby the cross-over connection will be located within the perimeter of a geometric rectangular space, and the hot and cold water faucets will have the same relative positions with respect to each receptacle.

These objects and other incidental features of my invention, and the details of construction and mode of installation are hereinafter fully described with reference to the accompanying drawings:

In the drawings:

Fig. 1 shows a perspective view of a cross-over connection embodying my invention;

Fig. 2 shows a view in cross section on line 2—2 of Fig. 3;

Fig. 3 shows a top plan view of the same;

Fig. 4 shows a view in horizontal section through the partition wall of a building, showing a back-to-back arrangement of plumbing fixtures mounted thereon and illustrating the arrangement of my cross-over connection;

Fig. 5 shows a fragmentary view in vertical section on line 5—5 of Fig. 4;

Fig. 6 shows a perspective view of a modified form of my cross-over connection;

Fig. 7 shows a view in cross section on line 7—7 of Fig. 8;

Fig. 8 shows a top plan view of the same;

Fig. 9 shows a view in side elevation of the cross-over connection illustrated in Fig. 6, installed in a partition wall;

Figures 10, 11:
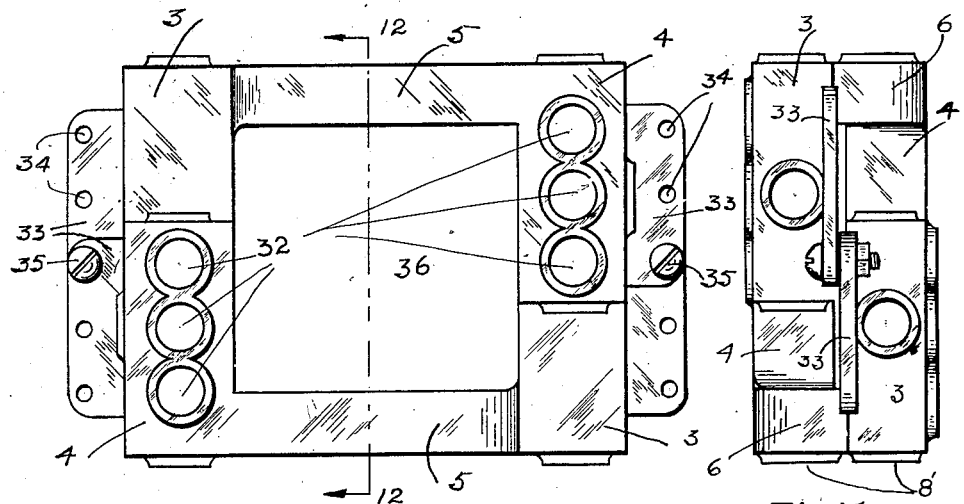
Fig. 10 shows a detached view in side elevation of a still further modified form of my improved cross-over connection.
Fig. 11 shows a view in end elevation of the same.

With reference to the drawings, and particularly to Figs. 1 to 5 inclusive, my invention comprises tubular cross-over sections 1 and 2, adapted respectively for hot and cold water connections, and consisting of straight pipe sections provided on each end with chambered heads 3 and 4. The chambered head 4 of each section is offset, that is, forms a goose neck portion 6, so that when the cross-over sections are laid side by side, the chambered heads 4 will be located on the far side of the chambered head 3 of the other section.

The respective faces 7, 8, 9 and 10 of the chambered heads 3 and 4 are provided with threaded outlets 7', 8', 9' and 10' to which hot and cold water service pipes 13 and 14 and faucets 17 and 21 may be connected.

As illustrated in Figs. 4 and 5, I have shown my cross-over sections arranged side by side and installed in the wall space 12 between the back-to-back fixtures such as lavatory bowls 11, 11'. The hot and cold water supply pipes 13 and 14 are spaced, as shown, and are connected to the respective cross-over sections 1 and 2 by pipe connections 15 and 16, threaded into the outlets 9' in the chambered heads 3 adjacent the said service pipes.

The cold water faucet 17 of the lavatory basin 11 is connected as at 22 to the outlet 10' in the chambered head 4 of the cross over section 1, and the cold water faucet 17 of the lavatory basin 11' is connected as at 22$^a$ at the other end of the said cross-over section, to the outlet 10' in the chambered head 3.

Similarly, the hot water faucets 21 are connected to the opposite ends of the cross-over section 2 in the outlets 10' in the chambered heads 4 and 3, respectively, by means of suitable connections 22$^b$ and 22$^c$.

By this construction and arrangement, the hot and cold water faucets 17 and 21 may be arranged on the relative side of the back-to-back fixtures 11 and 11' and connected to the hot and cold water service pipes 13 and 14, without the use of numerable pipe fittings and the loss of considerable time required to install them.

Of course, the outlets not in use may be closed by suitable plugs 25 or the like, but by providing outlets on each face of the chambered heads, my cross-over connections may be adapted for a variety of arrangements, such as to meet the requirement of the location of service pipes and waste and drain pipes 23 and 24 and the amount of wall space available.

As a further adaptation of my cross-over connections, I have illustrated in Fig. 9, surge chambers 26 mounted in the outlet 7' on the upper faces 7 of the chambered heads to cushion the effect of sudden closing of the faucets.

Further, in Figs. 6 to 9, inclusive, I have shown a modification of my cross-over connections in which the sections 1 and 2 are bent to form obtuse angles, thus providing a space 27 between them, through which the connections 28 of the waste pipe 23 may be arranged.

In this modification, the chambered head may be offset or not. In the latter case the sections will be arranged as shown in Figs. 6, 7, and 8, crossing over each other, but in straight lines.

For rigidity in connecting the sections together, complementary ears 29 are provided on the ends of the sections, through which suitable bolts 30 may be secured.

Figures 12, 13:
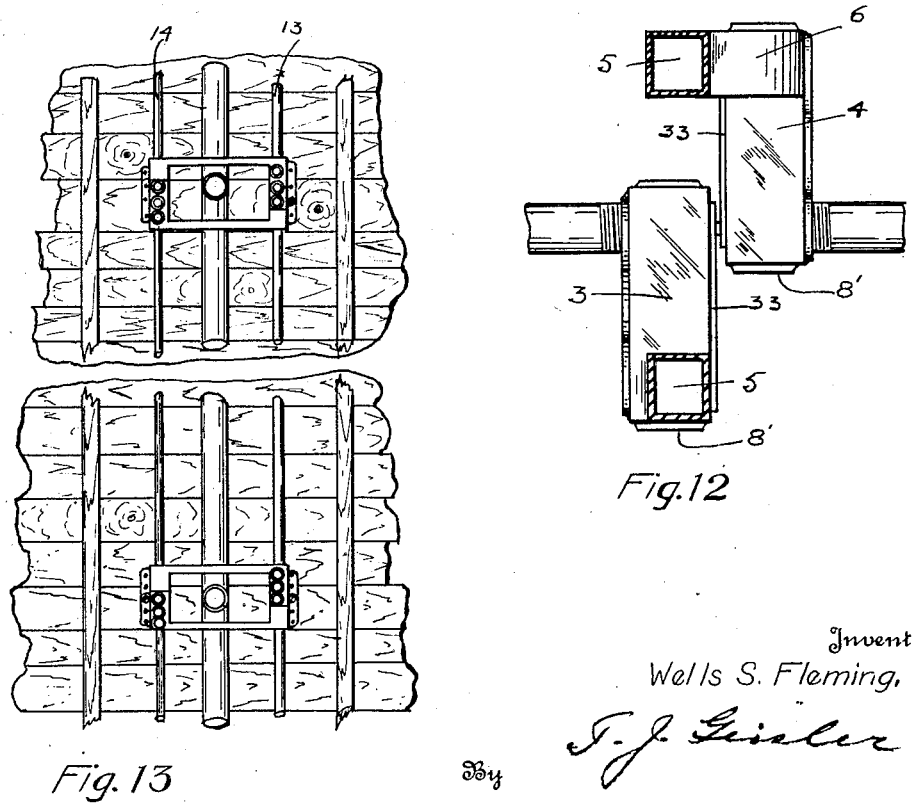
Fig. 12 shows a view in cross section on line 12—12 of Fig. 10.
Fig. 13 shows a side elevation of the modification of my invention illustrated in Fig. 10.

In Figs. 10 to 13 inclusive, I have shown a further modification in which the sections are right angular, and when assembled form a rectangle figure, which provides spaces for a plurality of holes 34 to receive securing bolts 35, at various adjustments, and to also provide additional space for a plurality of outlets 32. This form of my cross-over connection also permits overflow and drain pipes to be arranged between them.

As illustrated in Fig. 9, the hot and cold water service pipes may lead directly into the cross-over sections by means of pipe sections 13' and 14', respectively, extending from one floor to the other in a vertical line and connecting to the outlets 7', 8', respectively, at the several floors.

I claim:

1. In combination with a plumbing fixture comprising water-receiving receptacles arranged back-to-back, and hot and cold water faucets located to discharge into said receptacles, respectively, a cross-over connection between said faucets and hot and cold water service pipes thereof, said connections consisting of tubular sections, the opposite ends of each section being provided with heads adapted to be arranged with the head at one end of one section located on the far side of the head at the same end of the other section, said heads provided with outlets, whereby the hot and cold water faucets will have the same relative positions with respect to each receptacle.

2. In combination with a plumbing fixture comprising water-receiving receptacles arranged back-to-back, and hot and cold water faucets located to discharge into said receptacles, respectively, a cross-over connection between said faucets and hot and cold water service pipes thereof, said connection consisting of tubular sections, the opposite ends of each section being provided with heads adapted to be arranged with the head at one end of one section located on the far side of the head at the same end of the other section, said heads provided with outlets, the centers of the outlets of alined heads being arranged to register, whereby the hot and cold water faucets will have the same relative positions with respect to each receptacle.

3. In combination with a plumbing fixture comprising water-receiving receptacles arranged back-to-back, and hot and cold water faucets located to discharge into said receptacles, respectively, a cross-over connection between said faucets and hot and cold water service pipes thereof, said connection consisting of straight tubular sections, the opposite ends of each section being provided with heads, to be arranged side by side with the head at one end of one section located on the far side of the head at the same end of the other section, said heads provided with outlets, whereby the cross-over connection will be located within the perimeter of a geometric rectangular space, and the hot and cold water faucets will have the same relative positions with respect to each receptacle.

4. In combination with a plumbing fixture comprising water-receiving receptacles arranged back-to-back, and hot and cold water faucets located to discharge into said receptacles, respectively, a cross-over connection between said faucets and hot and cold water service pipes thereof, said connection consisting of straight tubular sections, the opposite ends of each section being provided with heads to be arranged side by side with the head at one end of one section located on the far side of the head at the same end of the other section, said heads provided with outlets, the centers of the outlets of alined heads being arranged to register, whereby the cross-over connection will be located within the perimeter of a geometric rectangular space, and the hot and cold water faucets will have the same relative positions with respect to each receptacle.

5. In combination with a plumbing fixture comprising water-receiving receptacles arranged back-to-back, and hot and cold water faucets located to discharge into said receptacles, respectively, a cross-over connection between said faucets and hot and cold water service pipes thereof, said connection consisting of tubular sections, the opposite ends of each section being provided with heads one of which is offset to adapt the tubular sections to be arranged with the head at one end of one section located on the far side of the head at the same end of the other section, said heads provided with outlets, whereby the hot and cold water faucets will have the same relative positions with respect to each receptacle.

6. In combination with a plumbing fixture comprising water-receiving receptacles arranged back-to-back, and hot and cold water faucets located to discharge into said receptacles, respectively, a cross-over connection between said faucets and hot and cold water service pipes thereof, said connection consisting of tubular sections, the opposite ends of each section provided with heads, one of which is offset to adapt the tubular sections to be arranged with the head at one end of one section located on the far side of the head at the same end of the other section, said heads provided with outlets, the centers of the outlets of alined heads being arranged to register, whereby the hot and cold water faucets will have the same relative positions with respect to each receptacle.

WELLS S. FLEMING.